Aug. 23, 1932.

C. DAHL

AMUSEMENT SWING

Re. 18,572

Original Filed March 31, 1927

3 Sheets-Sheet 1

Witness.
L. A. McKnight.

Inventor.
Conrad Dahl.
by Burton & Burton
his Attorneys.

Aug. 23, 1932. C. DAHL Re. 18,572

AMUSEMENT SWING

Original Filed March 31, 1927 3 Sheets-Sheet 2

Witness.
H. G. McKnight.

Inventor.
Conrad Dahl.
by Bentley & Bentley
his Attorneys.

Aug. 23, 1932.

C. DAHL

AMUSEMENT SWING

Re. 18,572

Original Filed March 31, 1927 3 Sheets-Sheet 3

Witness
L. Q. McWright.

Inventor.
Conrad Dahl.
by Bond & Bond
his Attorneys.

Reissued Aug. 23, 1932 Re. 18,572

UNITED STATES PATENT OFFICE

CONRAD DAHL, OF CHICAGO, ILLINOIS, ASSIGNOR OF ONE-HALF TO MYRON A. PARDIECK AND ONE-HALF TO SELECTED PRODUCTS CORPORATION, A CORPORATION OF WISCONSIN

AMUSEMENT SWING

Original No. 1,680,970, dated August 14, 1928, Serial No. 179,791, filed March 31, 1927. Application for reissue filed November 21, 1929. Serial No. 408,909.

This invention relates to a pleasure swing of the rider-propelled type intended especially for use by children, and therefore designed with particular attention to ease and safety of operation. It consists of certain elements and features of construction in combination, as herein shown and described and as indicated by the claims.

Figure 1:
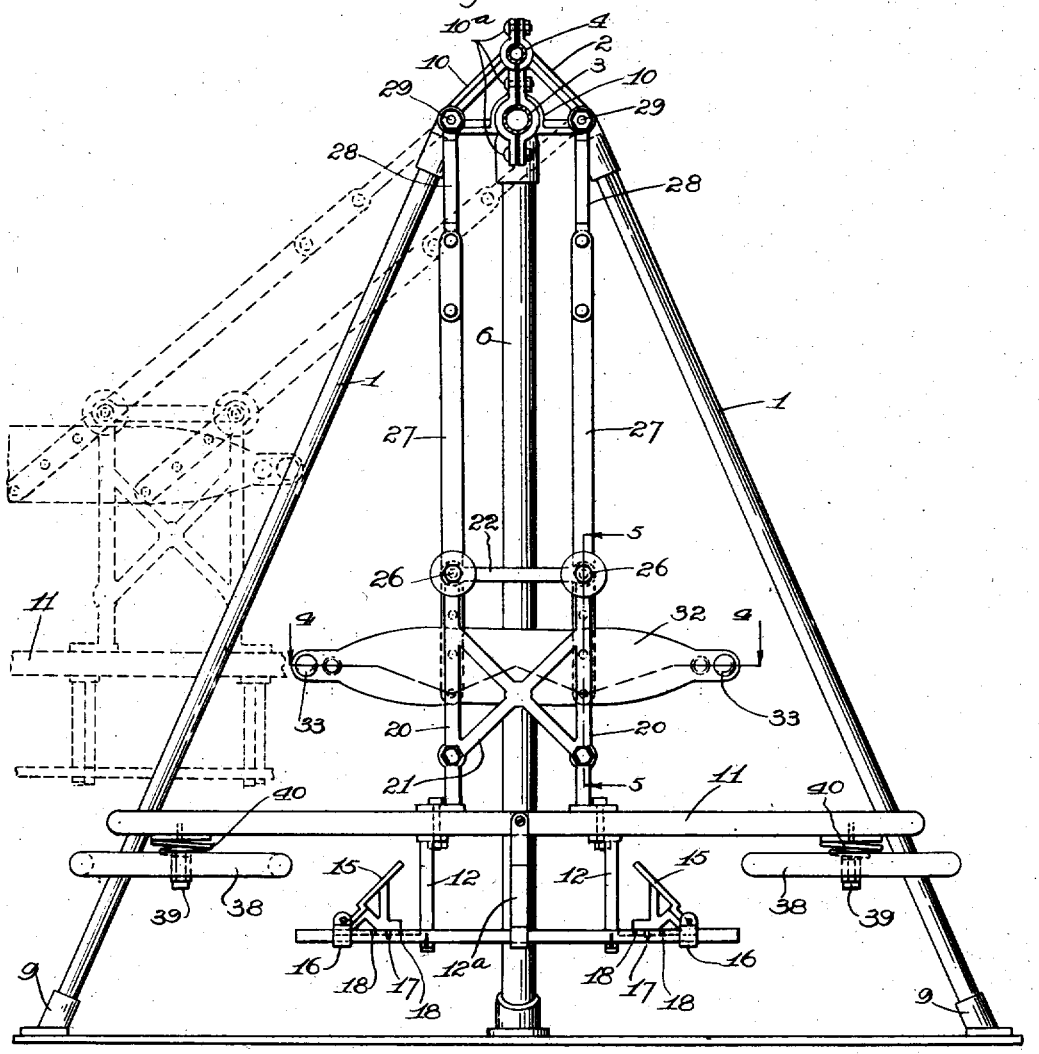
Figure 1 is in the nature of a vertical section but shows most of the swing in side elevation, section being taken as indicated at line, 1—1, on Figure 2.
Figure 2:
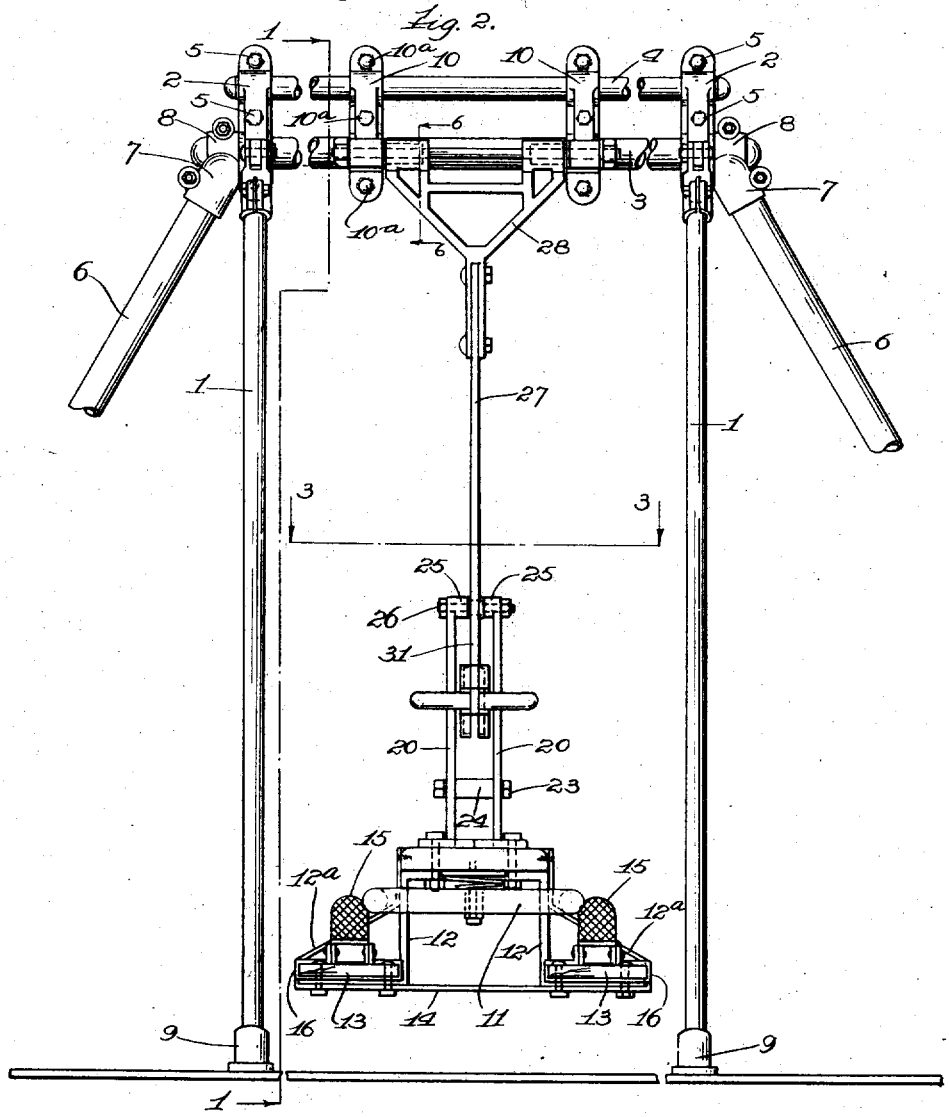
Figure 2 is an end elevation of the swing and portions of its supporting frame.

As shown in the drawings, the supporting frame for the swing comprises posts, 1, 1, disposed in vertical planes at both sides of the swing carriage and sloping upwardly and convergently for connection with head castings, 2—2, which in turn are transversely joined by a large tubular cross bar, 3, and a smaller cross bar, 4, as indicated in Figures 1 and 2. At each side of the frame the head casting, 2, is made in two parts separable at the vertical median plane which is common to the cross bars, 3 and 4, and the two parts are clamped together by bolts, 5, to embrace said cross members, 3 and 4. Oblique braces, 6, extend downwardly and outwardly from the head castings 2, being connected thereto by terminal sockets, 7, formed with clamping collars, 8, which engage the laterally projecting ends of the cross bar 3. The supporting frame thus consists of two sets of three legged structures spaced apart by the parallel vertical planes of the uprights, 1, and tied together by the cross bars, 3 and 4, at their upper ends. The lower ends of the post members may be anchored in any convenient manner; they are shown with foot sockets, 9, which may be secured to a wooden or concrete floor or otherwise firmly fastened in the ground according to circumstances of location. The cross bars, 3 and 4, may be of any desired length, as indicated by the broken representation of these parts in Figure 2; in some cases a single set of uprights may support two or three swing carriages. To stiffen the construction and also to support the swing carriage I provide hanger brackets between the bars, 3 and 4 in the form of split clamps, 10, of triangular form secured by clamping bolts, 10*a*, in spaced relation on the cross bars, 3 and 4.

The swing carriage comprises a seat plank, 11, to the underside of which are attached brackets, 12, supporting foot boards, 13, at each side of the plank, 11, and tied together laterally by cross bars, 14; sloping braces, 12*a*, may also be provided at the middle of the carriage. Sloping foot rests, 15, are slidably secured to the foot boards, 14, by means of guide straps, 16, and each of them is adjustable longitudinally by the insertion of a pin, 17, on the under side of the foot rest in one of a series of holes, 18, in the foot board, 13.

To the upper side of the seat plank, 11, a rigid frame is secured consisting of uprights, 20, spaced apart laterally in pairs, each pair being connected to each other in any suitable manner as by integral diagonal portions, 21, and horizontal bars, 22; the upper ends of the uprights, 20, are formed with bosses, 25, to carry pivot bolts, 26, whereby the rigid carriage structure is attached to hanger bars, 27, dependent from triangular yokes, 28, attached to their upper ends. The uprights are laterally joined by tie bolts, 23, with spacing sleeves, 24, interposed.

Figure 6:
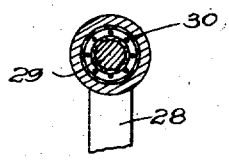
Figure 6 is a detail section of the hanger mounting as indicated at line, 6—6, on Figure 2.
Figure 3:
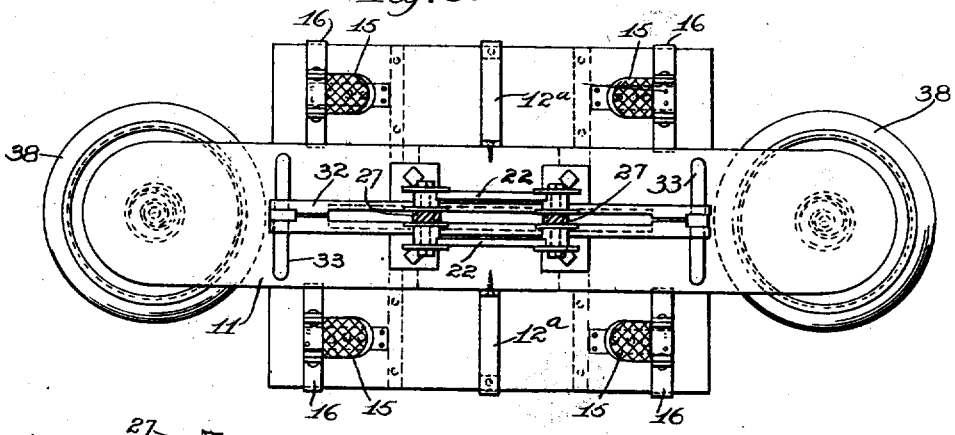
Figure 3 is a top plan view of the swing carriage taken as a section as indicated at the line, 3—3, on Figure 2.

The yokes, 28, are journaled on bearing rods, 29, carried by the triangular hanger brackets, 10, and preferably anti-friction rollers, 30, are used at this connection as indicated in Figure 6.

The swing carriage is thus swung from the bearing rods, 20, by parallel hanger bars, 27, of exactly equal length with the result that as the swing travels through its range of movement the seat plank, 11, remains horizontal at all positions, as indicated in dotted lines in Figure 1, and the angular movement of the hangers, 27, about the pivots, 26, takes place at a point far enough above the seat plank, 11, to avoid any danger of striking the heads of the riders.

Figure 5:
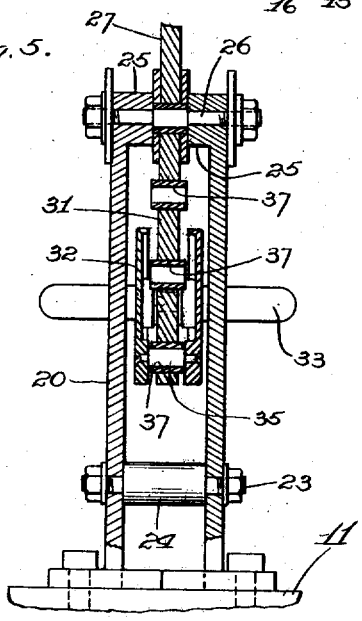
Figure 5 is a detail vertical section as indicated at line, 5—5, on Figure 1.
Figure 4:
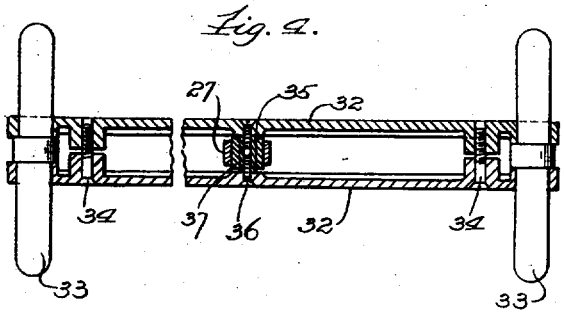
Figure 4 is a detail section of the operating lever taken as indicated at line, 4—4, on Figure 1.

For operation of the swing the hanger bars, 27, are extended downwardly below the pivots, 26 at 31 and these depending portions are pivotally connected to a horizontal operating member, 32, with handles, 33, mounted at its ends. The member, 32, remains parallel to the seat plank, 11, throughout the movement of the swing, but moves longitudinally with respect to the seat so that as the riders exert pressure or pull horizontally upon the handles, 33, they tend to move the hangers, 27, away from strictly vertical positions, and thus produce the swinging motion of the carriage. The member, 32, consists of two similar halves separable at a vertical plane and connected by tie bolts, 34. Pivot sleeves, 35, are secured between the halves of the part, 32, by screws, 36, and bushings, 37, carried by the extensions, 31, of the hanger bars, 27, provide the pivotal bearings between these parts. To permit of varying the leverage or mechanical advantage of the operating member, 32, I prefer to arrange several bushings, 37, in the lower ends, 31, of the hangers, 27, so that the pivot sleeves, 35, may be shifted from one set of bushings to another when desired. As shown in Figure 5 the pivots, 35, are engaged in the lowest of the three bushings, 37; for connection with the upper bushings the member, 32, may be turned upside-down to provide proper clearance of the parts for operation. Thus for smaller children the member, 32, is connected in the lowest bushings, 37, thus bringing the handles, 33, conveniently near the seat plank, 11, and providing the greatest mechanical advantage in operation, while for larger children the handles, 33, may be raised to a position farther from the seat and by connection with one of the upper sets of bushings, 37, will provide a shorter leverage by which the larger and stronger children can operate the swing with a somewhat shorter working stroke.

The sides of the operating member, 32, are fitted between the uprights, 20, of the carriage frame with only slight clearance so that there is little chance that the riders will catch their fingers between these parts, particularly since there is no occasion for placing the hands on the portion of the member, 32, which travels back and forth between the uprights, 20. The travel of the member, moreover, is always in a direction perpendicular to the edges of the uprights, 20, so that there is no wedging or pinching action possible between these parts.

Owing to the connection of the member, 32, to the lower ends, 31, of the hangers, 27, the motion of the operating part, 32, is in the same direction as that of the swing carriage so that the inertia of any body movement by which the riders accompany their pushing or pulling efforts on the handles, 33, is added to such efforts and renders the operation of the swing easier and more natural than if the body motion were opposite to the direction of swing movement.

A safety feature to prevent injury to bystanders who might come too close to the path of the swing carriages is provided in the form of rubber armoured buffer wheels or disks, 38, attached to the under side of the seat plank at each end, preferably on pivots, 39, which are not rigidly secured to the seat plank but are attached thereto by coiled spring mounting members, 40, so that the buffer wheels, 38, will yield bodily upon colliding with a person in the path of the swing and thus avoiding serious injury.

Various changes may be made in the embodiment of the invention herein specifically described without departing from or sacrificing any advantages thereof as defined in the appended claims.

I claim:

1. In a pleasure swing, the combination of a supporting frame, pivoted hangers depending therefrom in parallel relation, a swing carriage including a seat and a portion extending rigidly upward therefrom having pivotal connection with the hangers, said hangers extending below such pivotal connections, and a horizontally movable operating member connecting the downwardly extended portions of the hangers.

2. In a pleasure swing, the combination of a supporting frame, pivoted hangers depending therefrom in parallel relation, a swing carriage including a seat and a portion extending rigidly upward therefrom having pivotal connection with the hangers, said hangers extending below such pivotal connections, and a horizontally movable operating member disposed above the plane of the seat and vertically adjustable connections between said operating member and the downwardly extending parts of said hangers.

3. In a pleasure swing the combination of a supporting frame, pivoted hangers depending therefrom in parallel relation, a swing carriage including a seat and a portion extending rigidly upward therefrom having pivotal connection with the hangers, a horizontally movable operating member disposed above the plane of the seat, and connections between said member and the hangers whereby the movement of the operating member over the seat is in the same direction as the bodily movement of the swing carriage with respect to its supporting frame.

4. In a pleasure swing the combination of a supporting frame, pivoted hangers depending therefrom in parallel relation, a swing carriage including a seat plank with foot boards depending therefrom at the sides, longitudinally adjustable foot rest members on said foot boards, a portion extending rigidly upward from the seat plank and having pivotal connection with the hangers at a distance above the plane of the seat at the middle of its length, a horizontally movable operating member disposed between the plane of the seat and said pivotal connections, said hangers having portions which extend rigidly downward below said pivotal connections for engagement with said operating member and handles arranged at opposite ends of said member.

5. In a pleasure swing, a supporting frame comprising two upright sections spaced apart laterally and connected at their upper ends by a pair of bars disposed one above the other; a pair of brackets engaging said connecting bars and spaced apart thereon within the space between the upright sections, a pair of parallel bearing rods horizontally supported by said brackets spaced apart in the direction of movement of the swing, and a swing carriage with hangers extending upwardly therefrom pivotally supported by said bearing rods.

6. In a pleasure swing, the combination of a supporting frame, pivoted hangers depending therefrom in parallel relation, a swing carriage including a seat and a frame portion extending rigidly upward therefrom comprising laterally spaced uprights and having pivotal connection with the hangers at a distance above the plane of the seat, a horizontally movable operating member disposed between the uprights of said carriage frame and between the plane of the seat, and said pivotal connection with the hangers, said hangers having portions which extend rigidly downward for engagement with said operating member, and said member projecting longitudinally from the carriage frame with a handle secured to its projecting portion having a range of operating movement entirely outside said frame.

7. In a pleasure swing, the combination of a supporting frame, a carriage and pivoted hangers depending from the frame in parallel relation for connection with the carriage, together with a buffer wheel associated with the carriage on a substantially vertical pivot, said wheel being peripherally padded and its pivot being yieldingly connected to the carriage.

8. In a pleasure swing, the combination with a frame, of a carriage including a seat, oscillatable means depending from said frame, a carriage pivotally connected to said oscillatable means intermediate the extremities thereof, a seat on said carriage, said seat being maintained horizontal responsive to the movement of said oscillatable means, and handle means operatively connected to said oscillatable means below the pivotal connection of said carriage therewith for displacement in the directional line of seat movement.

9. In a pleasure swing, the combination with a frame, of a carriage including a seat, oscillatable means depending from said frame, a carriage pivotally connected to said oscillatable means intermediate the extremities thereof, a seat on said carriage, said seat being maintained horizontal responsive to the movement of said oscillatable means, and a horizontally movable manual operating member connected to said oscillatable means below pivotal connection of said carriage therewith.

10. In a pleasure swing, the combination with a frame, of a carriage including a seat, oscillatable means depending from said frame, a carriage pivotally connected to said oscillatable means intermediate the extremities thereof, a seat on said carriage, said seat being maintained horizontal responsive to the movement of said oscillatable means, a horizontally movable manual operating member connected to said oscillatable means below pivotal connection of said carriage therewith, and foot rests on said carriage to enable an operator to exert manual and pedal force in effecting the movement of said seat.

11. In a pleasure swing, the combination with a frame, of a carriage including a seat, oscillatable means depending from said frame, a horizontally movable carriage pivotally connected to said oscillatable means intermediate the extremities thereof, seats on said carriage aligned on both sides of its pivotal connection with said oscillatable means to enable the straddled support of individuals thereon, and a horizontally movable operating member extending in parallelism with said seats for connection to said oscillatable means below the pivotal connection of said carriage therewith to effect the horizontal displacement of said seats.

12. In a pleasure swing, the combination with a frame, of a carriage including a seat, oscillatable means depending from said frame, a horizontally movable carriage pivotally connected to said oscillatable means intermediate the extremities thereof, seats on said carriage aligned on both sides of its pivotal connection with said oscillatable means to enable the straddled support of individuals thereon, a horizontally movable operating member extending in parallelism with said seats for connection to said oscillatable means below the pivotal connection of said carriage therewith, and foot rests on said carriage to enable the manual and pedal application of force in effecting the movement of said seats responsive to the displacement of said operating member.

In witness whereof, I subscribe my name.

CONRAD DAHL.